(12) United States Patent
Angelo et al.

(10) Patent No.: US 8,991,538 B2
(45) Date of Patent: Mar. 31, 2015

(54) CAB SUSPENSION AND REPOSITIONING SYSTEM

(71) Applicants: Gerald Jay Angelo, Bellevue, WA (US); Larry F. Gulan, Seattle, WA (US); Theodore J. Scherzinger, Sammamish, WA (US)

(72) Inventors: Gerald Jay Angelo, Bellevue, WA (US); Larry F. Gulan, Seattle, WA (US); Theodore J. Scherzinger, Sammamish, WA (US)

(73) Assignee: PACCAR Inc, Bellevue, WA (US)

( * ) Notice: Subject to any disclaimer, the term of this patent is extended or adjusted under 35 U.S.C. 154(b) by 92 days.

(21) Appl. No.: 13/787,003

(22) Filed: Mar. 6, 2013

(65) Prior Publication Data

US 2014/0251711 A1   Sep. 11, 2014

(51) Int. Cl.
| | | |
|---|---|---|
| *B62D 33/063* | (2006.01) | |
| *B62D 33/06* | (2006.01) | |
| *B62D 33/073* | (2006.01) | |

(52) U.S. Cl.
CPC .......... *B62D 33/063* (2013.01); *B62D 33/0608* (2013.01); *B62D 33/073* (2013.01)
USPC .................. 180/89.13; 180/89.12; 180/89.14; 296/190.04; 296/190.06

(58) Field of Classification Search
CPC ........................ B62D 33/0604; B62D 33/0608
USPC ............ 180/89.14, 89.13, 89.12; 296/190.06, 296/190.07, 190.08, 190.04, 190.05
See application file for complete search history.

(56) References Cited

U.S. PATENT DOCUMENTS

| | | | |
|---|---|---|---|
| 4,921,062 A | 5/1990 | Marlowe | |
| 4,998,592 A | 3/1991 | Londt | |
| 5,044,455 A | 9/1991 | Tecco | |
| 5,201,379 A | 4/1993 | Penzotti | |
| 5,299,651 A | 4/1994 | Wilson | |
| 5,553,911 A * | 9/1996 | Bodin et al. ............. | 296/190.07 |
| 5,725,066 A | 3/1998 | Beard | |
| 6,073,714 A | 6/2000 | McHorse | |
| 6,168,229 B1 | 1/2001 | Kooi | |
| 6,206,121 B1 * | 3/2001 | Michel ....................... | 180/89.13 |
| 6,220,587 B1 * | 4/2001 | McKenzie et al. ............ | 267/256 |
| 6,702,367 B2 * | 3/2004 | Leitner et al. ............ | 296/190.07 |
| 6,726,272 B1 | 4/2004 | Puterbaugh | |
| 6,758,294 B2 * | 7/2004 | Peddycord et al. ........ | 180/89.12 |
| 6,817,433 B1 | 11/2004 | Bergstrom | |
| 7,077,227 B2 | 7/2006 | Oliver | |
| 7,950,726 B2 * | 5/2011 | Brown ..................... | 296/190.07 |
| 8,434,581 B2 * | 5/2013 | Buhl et al. ................. | 180/89.12 |
| 2007/0278811 A1 * | 12/2007 | Derham et al. .............. | 296/35.1 |

* cited by examiner

*Primary Examiner* — James English
(74) *Attorney, Agent, or Firm* — Christensen O'Connor Johnson Kindness PLLC

(57) ABSTRACT

A cab suspension and repositioning system (110) for a truck includes a control arm assembly (130) having two control arms (134, 136) with distal ends pivotably attached to a truck chassis (112) and proximal ends pivotably attached to a cab (102), and one or more follower control arms (144, 146) having a distal end pivotably attached to the chassis (112) and a proximal end pivotably attached to the cab (102). Cab suspension assemblies (114, 170) releasably lock the cab (102) to the chassis (112) during operation. The control arm assembly (130) further provides motion control to the cab (102). Hydraulic cylinders (140) engage the control arm assembly (130) and are operable to move the cab (102) between an operating position adjacent the chassis and an access position away from the chassis (112) substantially without rotating the cab (102). A control system (200) powers the cylinders (140) and controls the transition between the operating and access positions.

23 Claims, 6 Drawing Sheets

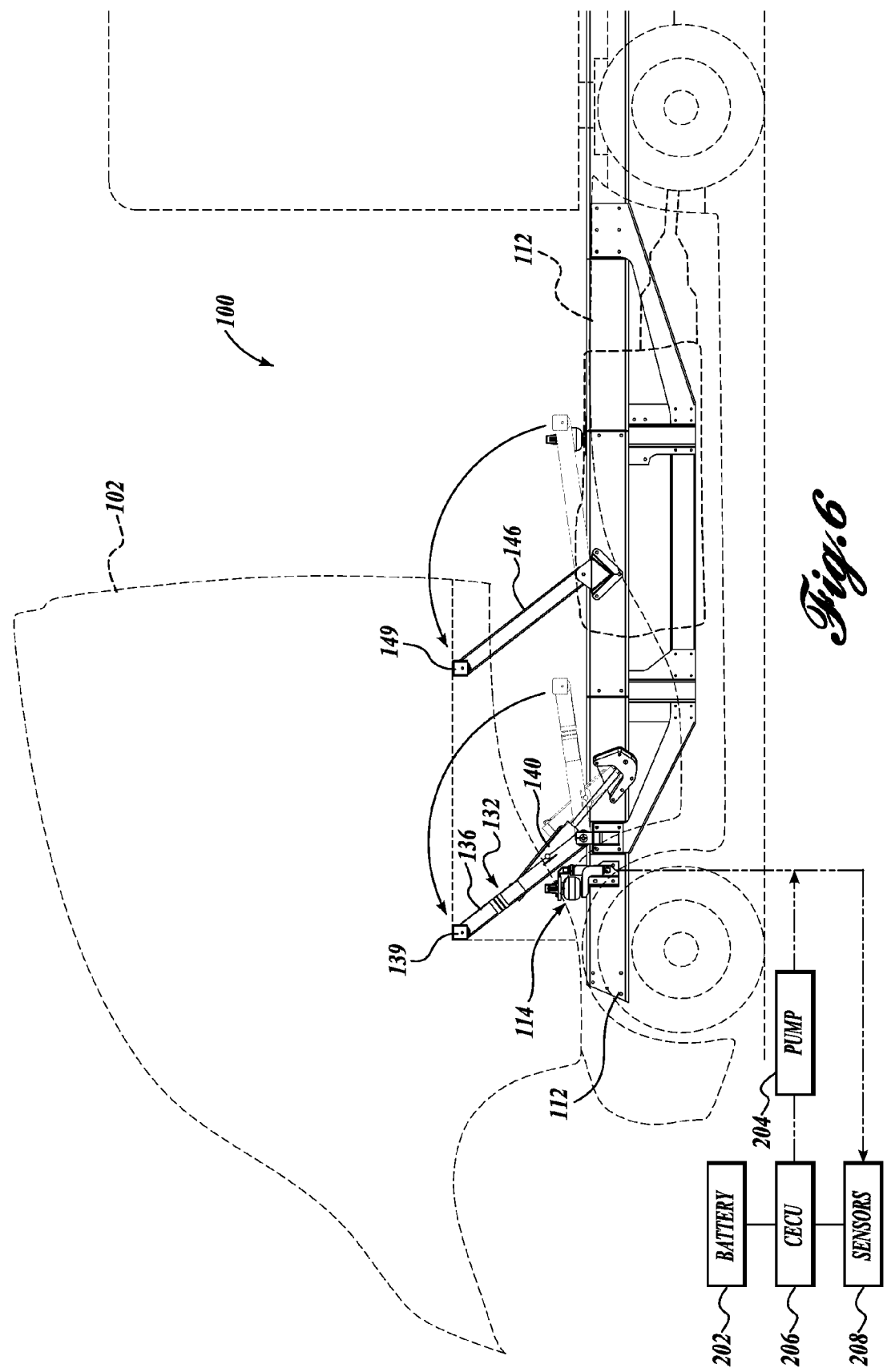

CAB SUSPENSION AND REPOSITIONING SYSTEM

BACKGROUND

Many commercial trucks, for example Class 8 cab-over-engine trucks, provide a cab for the driver that is disposed directly over, or even forward of, the truck engine. Typically, the cab must be moved or removed in order to access the engine, transmission, and/or related equipment, for servicing and the like. In most Class 8 cab-over-engine trucks the cab is pivotably mounted to a front portion of the chassis. To access the engine area, the user follows a prescribed procedure to configure the truck for repositioning the cab and then pivots the cab forward.

An example of such a truck is disclosed in U.S. Pat. No. 4,921,062, to Marlowe, which is hereby incorporated by reference in its entirety. Marlowe discloses a cab with a frontal nose hood for gaining access to the radiator and certain components, wherein the cab is also pivotably mounted to a truck chassis. Another example is disclosed in U.S. Pat. No. 6,073,714, to McHorse et al., which is hereby incorporated by reference in its entirety. McHorse et al. discloses a pivotable cab that engages a cab suspension system when the cab is in operation.

There are disadvantages to having to tilt the cab, however. For example, the procedure for configuring the truck in preparation for tilting can be difficult and time-consuming. Generally, one step in the process is to remove or secure any loose objects that are in the cab in order to prevent these objects from undesirably shifting when the cab is tilted. Loose items in the cab may impact and cause damage to the cab or equipment in the cab, including, for example, the windshield, radio equipment, and the like. Even relatively lightweight items may become inconveniently displaced due to shifting during the repositioning of the cab.

There is a need for an improved system for trucks that will allow for easier repositioning of the cab to selectively move the cab away from the engine compartment without requiring any significant pivoting of the cab. Of course, it is desirable that any system for repositioning the cab be lightweight, simple to operate, and reliable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A cab suspension and repositioning system for a truck includes a control arm structure with a first control arm with one end pivotably attached to the chassis and the other end pivotably attached to the cab, a second control arm also pivotably attached the chassis and cab, and a transverse torsion member. In part, the control arm structure controls the cab sway during operation of the truck. The system also includes a third control arm pivotably attached to the chassis and the cab, and optionally a fourth control arm. One or more drive cylinders, for example hydraulic cylinders, are pivotably attached to the chassis and the control arm structure. A pump is fluidly connected to the drive cylinder, and is operable to selectively extend the drive cylinders to move the control arm structure from an operating position wherein the cab is adjacent the chassis to an access position wherein the cab is moved to provide access to the engine compartment.

In an embodiment the suspension and repositioning system includes a plurality of air springs and or a plurality of associated shock absorbers that are attached to the chassis and are positioned to support the cab on the chassis in the operating position. One or more of the air springs may include a releasable latch that secures the cab during operation.

In an embodiment the suspension and repositioning system the arms of the control arm structure define elongate slots, and the drive cylinders extend through an associated one of the elongate slots.

In an embodiment the suspension and repositioning system includes a rear suspension assembly that includes a lower cross member fixed to the chassis, and an upper cross member suspended above the lower cross member with air springs and/or shock absorbers. The upper and lower cross members may also be connected by a track bar to control relative lateral motion therebetween.

In an embodiment the multiple control arms are of equal length and are parallel, and are configured to remain parallel while the cab is repositioned.

An embodiment further comprises a computerized control system that controls repositioning the cab. The control system may include sensors that monitor the status of truck parameters, such as the brake position and the transmission position. In one embodiment the control system will not release the latches unless the parking brake is applied and the transmission is in neutral.

A method for moving a cab on a truck from an operating position to an access position includes: (i) attaching the cab to the chassis with a U-shaped control arm assembly that is pivotably attached to the chassis and to the cab, wherein the control arm assembly is also configured to control the cab sway during operation; (ii) further attaching the cab to the chassis with one or more follower control arms; (iii) attaching a drive cylinder to the chassis and to the U-shaped assembly, configured to move the cab between a first or operating position adjacent the chassis and a second or access position without substantially rotating the cab; and (iv) using a computerized control system to selectively operate the drive cylinder to move the U-shaped control arm assembly between the first position and the second position.

In an embodiment the control system receives status information from sensors, for example indicating the status of the parking brake, and will only release the cab from the first position based on the sensor report, for example only if the parking brake is set. In an embodiment, the control system further locks out the transmission from being engaged if the cab is in the second position.

A cab suspension and repositioning system for a truck having a cab and a chassis includes a U-shaped front control arm structure comprising (i) a front-left control arm having a distal end pivotally attached to a left side of the chassis and a proximal end pivotally attached to the cab, (ii) a front-right control arm having a distal end pivotally attached to a right side of the chassis and a proximal end pivotally attached to the cab, and (iii) a lateral torsion member joining the proximal end of the front-right control arm with the proximal end of the front-left control arm; a rear-left control arm having a distal end pivotally attached to a left side of the chassis and a proximal end pivotally attached to the cab, and a rear-right control arm having a distal end pivotally attached to a right side of the chassis and a proximal end pivotally attached to the cab; a left hydraulic cylinder having a distal end pivotally attached to the left side of the chassis and a proximal end pivotally attached to the front-left control arm, and a right hydraulic cylinder having a distal end pivotally attached to the right side of the chassis and a proximal end pivotally attached to the front-right control arm; and an hydraulic pump operably connected to the left and right hydraulic cylinders and operable to selectively extend the left and right hydraulic cylinders; wherein extending the left and right hydraulic cylinders will move the cab from a first position adjacent the chassis to a second position disposed above and forward of the first position without pivoting the cab.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a side view showing the cab of the truck shown in FIG. 1 moved to the second or access position.

DETAILED DESCRIPTION

Figure 1:
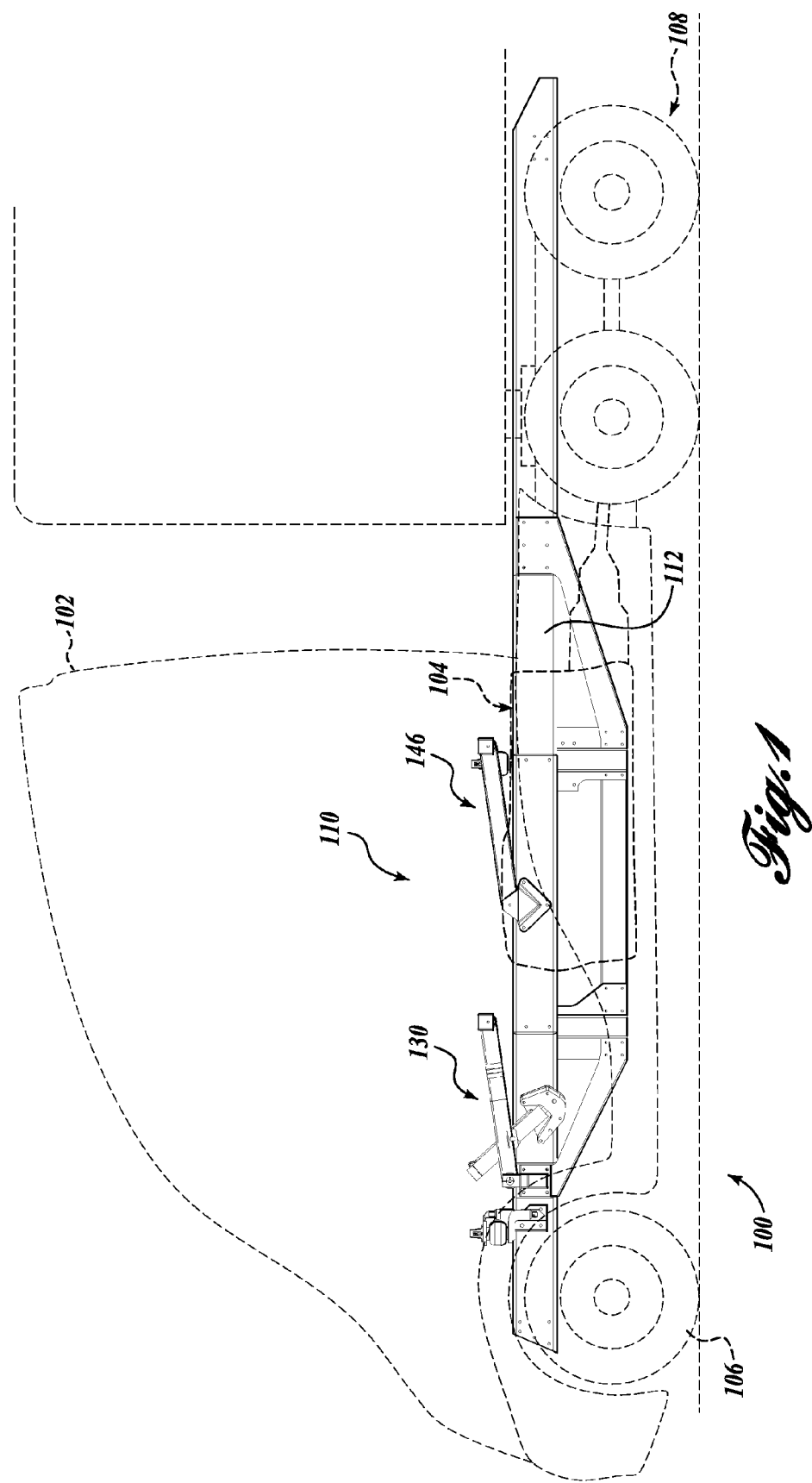
FIG. 1 is a side view of a truck having a cab suspension and repositioning system in accordance with the present invention, with the cab and axles shown in phantom.

A particular embodiment of a cab suspension and repositioning system in accordance with the present invention will now be described with reference to the FIGURES, wherein like numbers indicate like parts. FIG. 1 illustrates a truck 100, including a sleeper cab 102 supported on a chassis 112, an engine system 104, front axle assembly 106, and dual rear axle assembly 108, with the cab 102, engine system 104, and axle assemblies 106, 108 indicated in phantom. Although a tractor-truck 100 with a sleeper cab 102 is illustrated, the present invention is suitable for many other types of trucks. A cab suspension and repositioning system 110 in accordance with a particular embodiment of the present invention attaches the cab 102 to the chassis 112.

Figure 2:
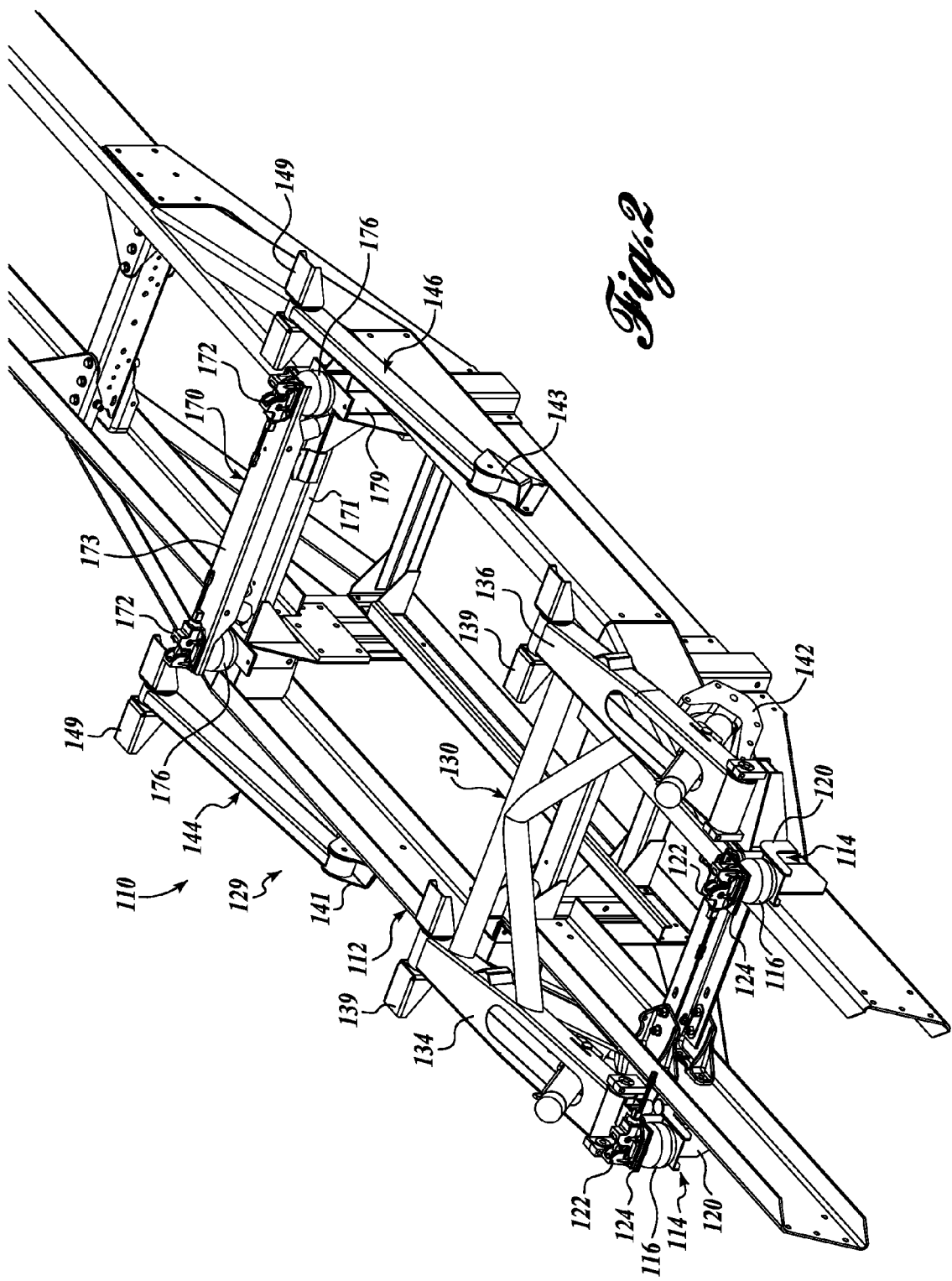
FIG. 2 is a perspective view of the cab suspension and repositioning system for the truck shown in FIG. 1.

A detail view of the cab suspension and repositioning system 110 is shown in FIG. 2, mounted to the chassis 112 and with other truck parts omitted for clarity. In this embodiment the cab suspension and repositioning system 110 includes (i) right and left front suspension assemblies 114 that are configured to engage and support a forward portion of the cab 102; (ii) a repositioning control arm assembly 129 including a front arm assembly 130 that engages the cab 102 at an intermediate location and provides suspension and repositioning functionality, and right and left rear control arms 144, 146, and (iii) a rear suspension assembly 170 that is configured to engage and support a rearward end of the cab 102.

Figure 3:
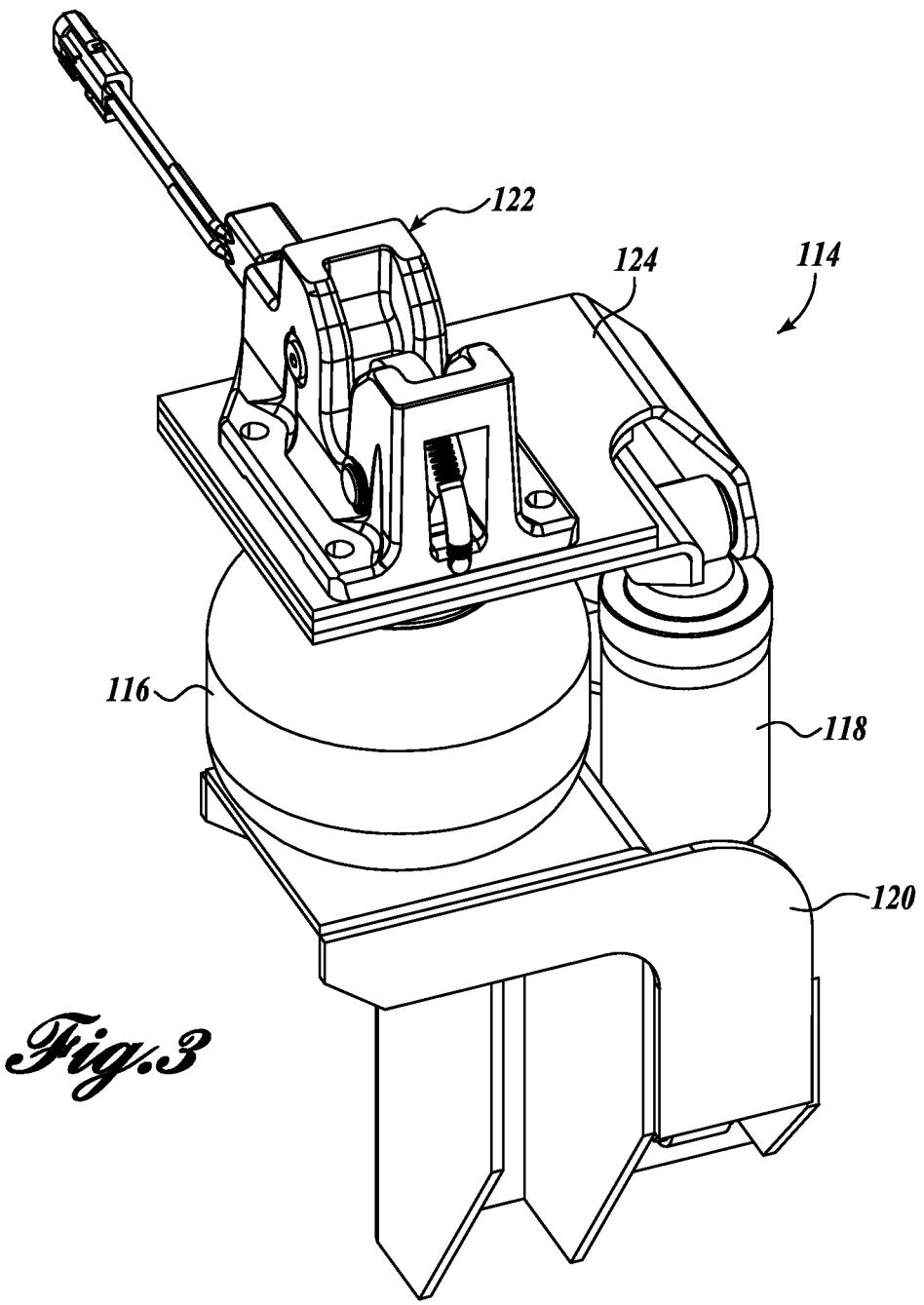
FIG. 3 is a perspective view of a left front cab suspension assembly for the cab suspension and repositioning system shown in FIG. 2.

The left-front suspension assembly 114 is shown in isolation in FIG. 3. The right-front suspension assembly is similarly constructed, with mirrored construction to function on the right side of the chassis 112, as will be obvious to persons of skill in the art. The front suspension assemblies 114 each include a conventional air spring 116 and a shock absorber 118. The air spring 116 and shock absorber 118 are fixed to the chassis 112 with a bracket 120. A latch 122, for example an hydraulic latch, is configured to releasably engage an underside of the cab 102. The latch 122 is attached to the upper end of the air spring 116 and the shock absorber 118 with a latch plate 124. The latch 122 may be, for example, a Power-Packer® hydraulic latch.

Figure 4:
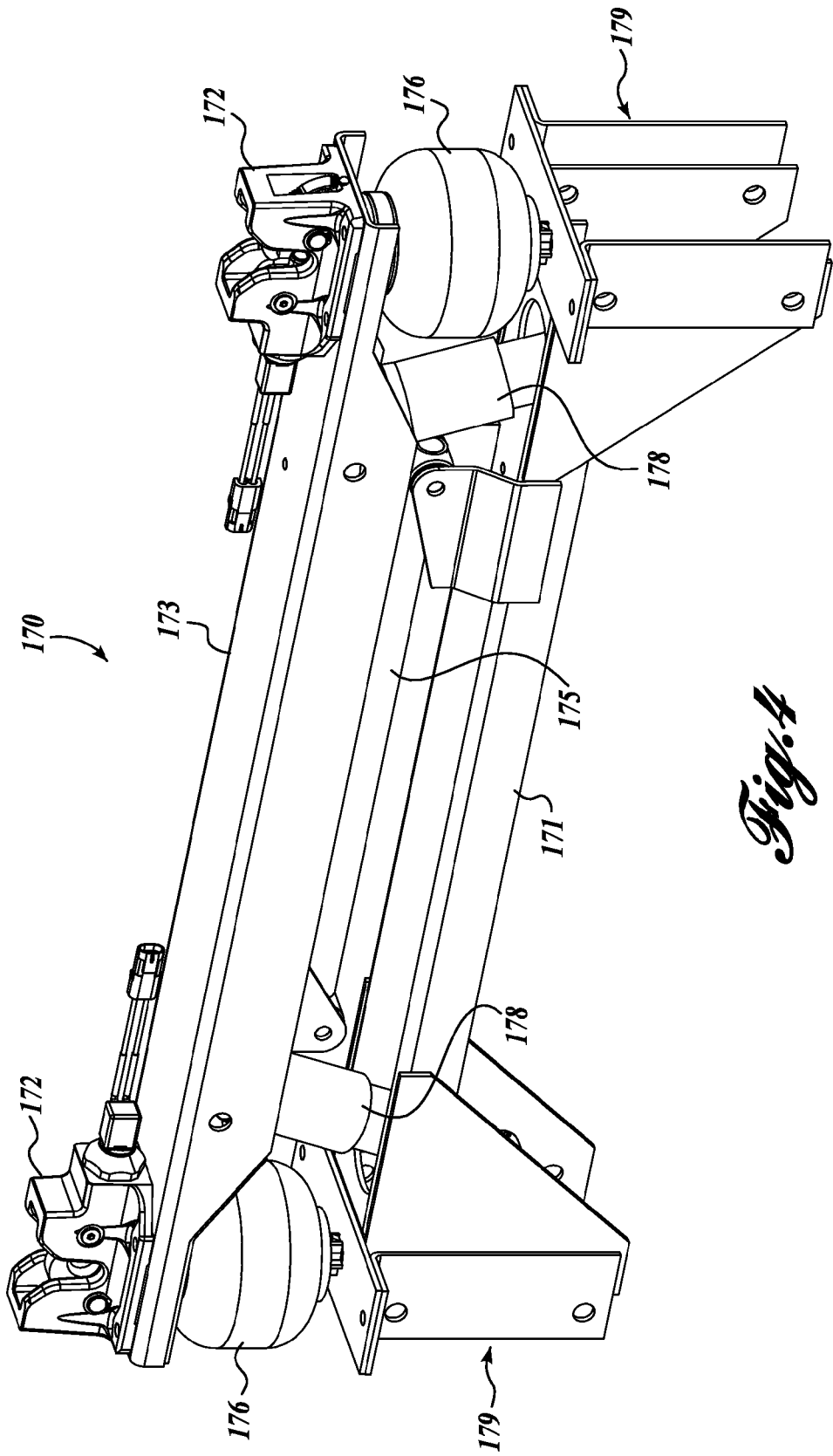
FIG. 4 is a perspective view of a rear suspension assembly for the cab suspension and repositioning system shown in FIG. 2.

The rear suspension assembly 170 is shown in isolation in FIG. 4. A lower cross member 171 is fixed to the chassis 112 with attachment brackets 179. An upper cross member 173 is suspended above the lower cross member 171 with air springs 176 disposed between the lower and upper cross members 171, 173. The upper cross member 173 is also supported by shock absorbers 178 that extend through corresponding apertures in the lower cross member 171. A pair of latches 172, for example hydraulic latches, are attached to the upper cross member 173 and are positioned over the corresponding air springs 176. The latches 172 are configured to releasably engage a rearward portion of the cab 102, and may be similar to the forward hydraulic latches 122. A single centrally located leveling valve (not shown) is connected between the upper and lower cross members 173, 171. In the current embodiment, the rear suspension assembly 170 includes a panhard rod 175, also known as a track bar, that interconnects the cross members 171, 173 to provide lateral positional control for the rear of the cab 102.

Figure 5:
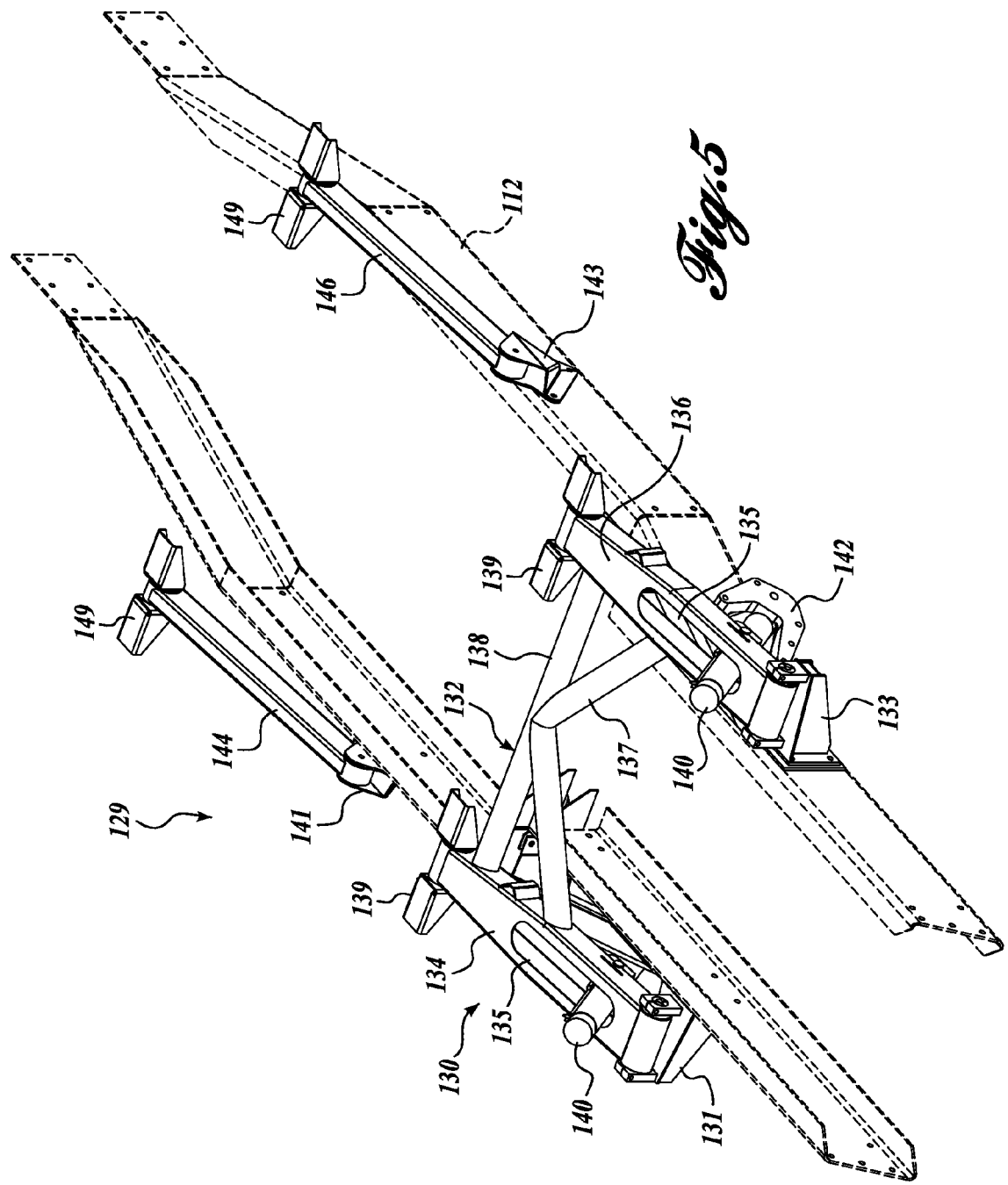
FIG. 5 is a perspective view of the repositioning control arm assembly for the cab suspension and repositioning system shown in FIG. 2.

The repositioning control arm assembly 129 is shown in FIG. 5, with a portion of the chassis 112 shown in phantom. The front control arm assembly 130 includes a U-shaped member 132 that is pivotably attached to the chassis 112, and a pair of hydraulic cylinders 140 that are configured to selectively pivot the U-shaped member 132 between a first position or operating position, wherein the cab 102 is positioned to engage the latches 122, 172 (FIG. 2), and a second position or access position, wherein the cab 102 is disposed away from the chassis 112.

The U-shaped member 132 comprises a right-front control arm 134 having a distal end attached to one side of the chassis 112 with a pivot assembly 131, and a left-front control arm 136 having a distal end attached to the other side of the chassis 112 with a pivot assembly 133. In the current embodiment, the control arms 134, 136 each define an elongate aperture 135 that is sized to pivotably receive the corresponding hydraulic cylinder 140. A proximal portion of the control arms 134, 136 are connected with a torsion member 138 and bracing 137 extending therebetween. Proximal pivot assemblies 139 disposed at the proximal end of the control arms 134, 136 are configured to attach the control arms 134, 136 to an underside of the cab 102.

A distal end of the hydraulic cylinders 140 is pivotably attached to the chassis 112 with brackets 142 (one visible). Although not visible in the FIGURES, in the current embodiment the distal end of the cylinders 140 include an elongate slot through which the cylinders 140 are pivotably attached to the chassis 112. The elongate slot is approximately aligned with the associated cylinder 140, and is configured to permit the cylinders 140 to slidably accommodate the vertical motion of the cab 102 permitted by the suspension system during operation, without inducing any significant load on the cylinders 140. A proximal portion pivotably engages the corresponding control arm 134, 136 of the U-shaped member 132. In the current embodiment, the cylinders 140 extend through the elongate apertures 135, which are sized to accommodate the relative motion between the U-shaped member 132 and the cylinders 140 without interference.

A right-rear control arm 144 is pivotably attached to the chassis 102 with a pivot assembly 141 and a left-rear control arm 146 is pivotably attached to the chassis 102 with a pivot assembly 143. The control arms 144, 146 are follower control arms, each with a proximal pivot assembly 149 that is configured to pivotably attach the control arm 144, 146 to the underside of the cab 102.

It will be appreciated by persons of skill in the art that the front control arm assembly 130 provides dual functionality. The U-shaped member 132 functions as a part of the suspension system for the cab 102 during operation, similar to the teachings of U.S. Pat. No. 5,299,651, to Wilson, and U.S. Pat. No. 6,073,714, to McHorse et al., both of which are hereby incorporated by reference. In particular, the U-shaped member 132 controls side roll, sway, and fore-aft pitch. In addition, the front control arm assembly 130 is configured to move the cab 102 between the operating position adjacent the chassis 112 with the cab positioned to engage the latches 122, 172, and the access position, wherein the cab 102 is disposed away from the latches 122, 172, thereby providing access to the engine system 104.

In the current embodiment, the front control arms 134, 136 are pivotably attached to the cab 102 with the pivot assemblies 139 attached at an intermediate location, preferably slightly forward of the cab center of gravity. The pivot assemblies 149 for the rear control arms 144, 146 are attached near the rear end of the cab 102.

However, it is contemplated and will be readily apparent to persons of skill in the art, that other configurations are possible, and may be preferable in certain applications. For example, it is contemplated that the control arms 144, 146 may alternatively be positioned to engage a forward portion of the cab 102 and the control arms 134, 136 may engage the cab 102 at an intermediate location rearward of the center of gravity. In some applications it may be desirable to reposition the cab laterally, rather than longitudinally. It is contemplated that the control arms 134, 136, 144, 146 may be oriented and configured to pivot about axes parallel to the centerline of the chassis 112 or at an acute angle with respect to the chassis, wherein the control arms 134, 136 engage a left side of the cab 102 and the control arms 144, 146 engage the right side of the cab 102.

In another alternative embodiment, the control arm assembly may be configured with only three arms. For example, the rear control arms 144, 146 shown in FIG. 2 may alternatively comprise a single control arm, which may advantageously be positioned along the centerline of the chassis 112.

The cab suspension and repositioning system 110 is shown in FIG. 6 in the second position or access position, with a current control system 200 indicated schematically. During operation, the vertical position of the cab 102 is controlled by a four-point cab suspension system defined by the front suspension assemblies 114 and the rear suspension assembly 170. The U-shaped member 132 stabilizes the cab 102, controlling side roll, sway, and fore-aft and side-to-side location of the cab. The cab 102 is secured to the suspension with hydraulically releasable latches 122, 172.

To provide access to the engine system 104, the cab 102 can be positioned away from the chassis with the system 110, without any substantial rotation of the cab 102. It will be readily apparent to persons of skill in the art that a small amount of rotation or pivoting of the cab 102 during repositioning may be allowed to provide all of the advantages of the present invention, and without departing from the present invention. As used herein, any reference to "without pivoting the cab," "without rotating the cab," "does not rotate the cab" or the like shall mean that the cab does not rotate or pivot more than +/− fifteen degrees.

The control arms 134, 136, 144, 146 in the current embodiment are substantially of equal length and parallel. In the first or operating position the control arms 134, 136, 144, 146 are disposed at an angle of between about five degrees and fifteen degrees, for example approximately eight degrees, with respect to the chassis 112.

In a current embodiment, the hydraulic cylinders 140 are double-acting hydraulic cylinders with the ram ends of the cylinders 140 pivotably connected to the chassis at a point aft of and below the pivot assemblies 131. The double-acting hydraulic cylinders 140 allow the cab to be returned from the access position to the operating position by reversing the flow to the cylinders 140. However, it will be readily apparent to persons of skill in the art that single-acting hydraulic cylinders may alternatively be used. Alternatively, although not currently preferred, other modes of actuation are contemplated. For example, it is contemplated that an electric motor system may be used to move the cab 102 between the first and second positions.

In the control system 200, an electrically driven hydraulic pump 204 is connected, for example to onboard batteries 202, and provides the hydraulic power to the hydraulic cylinders 140. The hydraulic pump 204 is controlled by a computer enhanced control unit (CECU) 206. Sensors 208 provide status input to the CECU 206. In the preferred embodiment the sensors 208 provide status information regarding the transmission, parking brake, and latch sensors. In the current system, the CECU 206 will only allow the hydraulic system to be pressurized when the truck 100 is in neutral, with the parting brake applied. In addition, the CECU 206 monitors the status of the latches 122, 172 and will not allow the hydraulic pressure to increase to a level sufficient to lift the cab 102 unless all of the latches 122, 172 have released the cab 102. In the current embodiment, the computerized control system is also configured to prevent the truck 100 from being shifted into gear unless the cab 102 is in the operating position and the latches 122, 172 are engaged.

The operation of the cab suspension and repositioning system 110 will now be described. During operation, the cab 102 is releasably attached to the suspension system 114, 117 on the chassis 112 with latches 122, 172. One end of the forward control arms 134, 136 is pivotably attached to the chassis 112 and configured to pivot about a first axis. An opposite end of the control arms 134, 136 is pivotably attached to the cab 102 and configured to pivot about a second axis parallel to the first axis. In this embodiment, the control arms 134, 136 engage the cab 102 forward of the cab center of gravity. A torsion member 138 connects the control arms 134, 136, such that the U-shaped suspension member 132 is operable to stabilize cab 102 motion during operation of the truck 100. One end of the rear control arms 144, 146 is pivotably attached to the chassis 112 and configured to pivot about a third parallel axis. The opposite end of each of the rear control arms 144, 146 is pivotably attached to the cab 102 and configured to pivot about a fourth parallel axis. In the current embodiment, the rear control arms 144, 146 engage a rearward portion of the cab 102.

The hydraulic cylinders 140 are pivotably attached to the chassis 112 and are pivotably attached to the control arms 134, 136, and configured to move the U-shaped member 132 and the cab 102 from the latched operating position to the access position. The CECU 206 receives status input from sensors 208 on the truck, and controls the hydraulic pump 204 to move the cab 102 between the operating and access positions. The system 110 moves the cab 102 between these positions without pivoting the cab 102.

While illustrative embodiments have been illustrated and described, it will be appreciated that various changes can be made therein without departing from the spirit and scope of the invention.

The embodiments of the invention in which an exclusive property or privilege is claimed are defined as follows:

1. A cab suspension and repositioning system for a truck having a cab and a chassis, the system comprising:
   a control arm structure comprising (i) a first control arm having a distal end configured to be pivotably attached to the chassis and a proximal end configured to be pivotably attached to the cab, (ii) a second control arm having a distal end configured to be pivotably attached the chassis and a proximal end configured to be pivotably attached to the cab, and (iii) a torsion member fixedly connecting the first control arm to the second control arm, wherein the control arm structure is configured to control cab sway during operation of the truck;
   a third control arm having a distal end configured to be pivotably attached to the chassis and a proximal end configured to be pivotably attached to the cab;
   a first hydraulic cylinder having a distal end configured to be pivotably attached to the chassis and a proximal end pivotably attached to the first control arm, and a second hydraulic cylinder having a distal end configured to be pivotably attached to the chassis and a proximal end pivotably attached to the second control arm; and
   a hydraulic pump operably connected to the first and second hydraulic cylinders, and operable to selectively extend the first and second hydraulic cylinders;
   wherein extending the first and second hydraulic cylinders moves the control arm structure from a first position wherein the cab is adjacent the chassis to a second position wherein the cab is disposed away from the chassis, without pivoting the cab; and
   further wherein the first, second, and third control arms are parallel and remain parallel when the first and second hydraulic cylinders move the control arm structure from the first position to the second position.

2. The cab suspension and repositioning system of claim 1, further comprising a fourth control arm having a distal end configured to be pivotably attached to the chassis and a proximal end configured to be pivotably attached to the cab.

3. The cab suspension and repositioning system of claim 1, further comprising a plurality of air springs configured to be attached to the chassis and positioned to support the cab on the chassis.

4. The cab suspension and repositioning system of claim 3, further comprising at least one latch that is fixed to an associated one of the plurality of air springs, wherein the latch is configured to releasably secure the cab to the associated air spring.

5. The cab suspension and repositioning system of claim 3, further comprising a plurality of latches, wherein each of the plurality of latches is associated with one of the plurality of air springs, and wherein the plurality of latches are configured to releasably secure the cab to the chassis.

6. The cab suspension and repositioning system of claim 5, further comprising a plurality of shock absorbers, wherein each of the plurality of shock absorbers is associated with one of the plurality of air springs.

7. The cab suspension and repositioning system of claim 1, wherein the first control arm defines a first elongate slot, and the proximal end of the first cylinder extends through the first elongate slot, and further wherein the second control arm defines a second elongate slot and the proximal end of the second cylinder extends through the second elongate slot.

8. The cab suspension and repositioning system of claim 1, further comprising a rear suspension assembly comprising a lower cross member comprising left and right attachment brackets configured to attach the lower cross member to the chassis, a left air spring attached to a left side of the lower cross member and a right air spring attached to a right side of the lower cross member, and an upper cross member attached to the left and right air springs and disposed above the lower cross member.

9. The cab suspension and repositioning system of claim 8, further comprising a left shock absorber that engages a left side of the upper cross member and a right shock absorber that engages a right side of the upper cross member.

10. The cab suspension and repositioning system of claim 8, further comprising a track bar having a first end pivotably connected to the lower cross member and a second end pivotably connected to the upper cross member.

11. The cab suspension and repositioning system of claim 1, further comprising a computerized control system having a processor, wherein the control system operates the pump to selectively control extending the first and second hydraulic cylinders to move the control arm structure from the first position to the second position.

12. The cab suspension and repositioning system of claim 11, wherein the control system further comprises a plurality of sensors configured to provide status information to the processor regarding a transmission and a parking brake.

13. A method for moving a cab on a cab-over-engine truck from an operating position wherein the cab is adjacent a truck chassis to an access position wherein the cab is disposed away from the chassis thereby providing access to an engine compartment, the method comprising:
   attaching the cab to the chassis with a U-shaped control arm assembly having a first control arm connected to a second control arm with a transverse torsion member, wherein the U-shaped control arm assembly is pivotably attached to the chassis and to the cab and is operable to control the cab sway during operation of the truck;
   attaching at least one drive cylinder to the U-shaped control arm assembly and to the chassis, wherein the at least one drive cylinder is configured to move the U-shaped control arm assembly between the operating position wherein the cab is adjacent the chassis and the access position wherein the cab is disposed away from the chassis; and
   further attaching the cab to the chassis with at least one additional control arm that is pivotably attached to the chassis and pivotably attached to the cab such that moving the U-shaped control arm assembly between the operating position and the access position does not rotate the cab;
   using a computerized control system to selectively energize the at least one drive cylinder to move the U-shaped control arm assembly between the operating position and the access position;
   providing at least one latch that releasably latches the cab in the operating position, and using the computerized control system to selectively move the latch between a secure position and a release position; and
   providing a sensor that is operable to detect a status of a transmission on the cab-over-engine truck and to provide the detected status to the computerized control system, and wherein the computerized control system is configured to move the latch from the secure position to the release position only if the transmission status indicates the transmission is in neutral.

14. The method of claim 13, wherein the computerized control system further comprises a transmission lockout control that is operable to prevent the transmission from being shifted out of neutral if the at least one latch is not in the secure position.

15. The method of claim 13, further comprising providing a sensor that is operable to detect a status of a parking brake on the cab-over-engine truck and to provide the detected status to the computerized control system, and wherein the computerized control system is configured to move the latch from the secure position to the release position only if the parking brake status indicates the parking brake is set.

16. A cab suspension and repositioning system for a truck having a cab and a chassis, the system comprising:
- a U-shaped front control arm structure comprising (i) a front-left control arm having a distal end pivotally attached to a left side of the chassis and a proximal end pivotally attached to the cab, (ii) a front-right control arm having a distal end pivotally attached to a right side of the chassis and a proximal end pivotally attached to the cab, and (iii) a lateral torsion member joining the proximal end of the front-right control arm with the proximal end of the front-left control arm;
- a rear-left control arm having a distal end pivotally attached to the left side of the chassis and a proximal end pivotally attached to the cab, and a rear-right control arm having a distal end pivotally attached to the right side of the chassis and a proximal end pivotally attached to the cab;
- a left hydraulic cylinder having a distal end pivotally attached to the left side of the chassis and a proximal end pivotally attached to the front-left control arm, and a right hydraulic cylinder having a distal end pivotally attached to the right side of the chassis and a proximal end pivotally attached to the front-right control arm; and
- a hydraulic pump operably connected to the left and right hydraulic cylinders and operable to selectively extend the left and right hydraulic cylinders;
- wherein extending the left and right hydraulic cylinders will move the cab from a first position adjacent the chassis to a second position disposed above and forward of the first position, without pivoting the cab.

17. The cab suspension and repositioning system of claim 16, further comprising four springs consisting of a forward-left spring, a forward-right spring, a rear-left spring, and a rear-right spring, and wherein the four springs are fixed to the chassis and positioned to engage the cab when the cab is in the first position.

18. The cab suspension and repositioning system of claim 17, wherein the four springs comprise air springs.

19. The cab suspension and repositioning system of claim 17, wherein at least one of the four springs further comprise a hydraulic latch movable between an engage position wherein the hydraulic latch secures the cab to the at least one spring, and a release position wherein the hydraulic latch does not secure the cab.

20. The cab suspension and repositioning system of claim 19, further comprising a plurality of sensors including a transmission position sensor and a parking brake position sensor, and a processor operably connected to receive data from the plurality of sensors and operably connected to control the hydraulic latch, and wherein the processor is configured to maintain the hydraulic latch in the engage position unless the transmission position sensor data indicates the transmission is in a neutral position and the parking brake sensor data indicates the parking brake is in an applied position.

21. The cab suspension and repositioning system of claim 16, wherein the front control arm structure rotates through at least ninety degrees when the cab moves from the first position to the second position.

22. The cab suspension and repositioning system of claim 16, wherein the left and right hydraulic cylinders are double-acting cylinders.

23. A cab suspension and repositioning system for a truck having a cab and a chassis, the system comprising:
- a control arm structure comprising (i) a first control arm having a distal end pivotably attached to the chassis and a proximal end pivotably attached to the cab, (ii) a second control arm having a distal end pivotably attached the chassis and a proximal end pivotably attached to the cab, and (iii) a torsion member fixedly connecting the first control arm to the second control arm, wherein the control arm structure is configured to control cab sway during operation of the truck;
- a third control arm having a distal end pivotably attached to the chassis and a proximal end pivotably attached to the cab;
- a first hydraulic cylinder having a distal end pivotably attached to the chassis and a proximal end pivotably attached to the first control arm, and a second hydraulic cylinder having a distal end pivotably attached to the chassis and a proximal end pivotably attached to the second control arm; and
- a hydraulic pump operably connected to the first and second hydraulic cylinders, and operable to selectively extend the first and second hydraulic cylinders;
- wherein extending the first and second hydraulic cylinders moves the control arm structure from a first position wherein the cab is adjacent the chassis to a second position wherein the cab is disposed away from the chassis, without pivoting the cab; and
- further wherein the first control arm defines a first elongate slot, and the proximal end of the first cylinder extends through the first elongate slot, and further wherein the second control arm defines a second elongate slot and the proximal end of the second cylinder extends through the second elongate slot.

* * * * *

UNITED STATES PATENT AND TRADEMARK OFFICE
CERTIFICATE OF CORRECTION

Page 1 of 1

PATENT NO. : 8,991,538 B2
APPLICATION NO. : 13/787003
DATED : March 31, 2015
INVENTOR(S) : G. J. Angelo et al.

It is certified that error appears in the above-identified patent and that said Letters Patent is hereby corrected as shown below:

In the Claims

| COLUMN | LINE(S) | ERROR |
|---|---|---|
| 7 | 9 | "attached the chassis" should read |
| (Claim 1, | line 7) | --attached to the chassis-- |
| 10 | 22-23 | "attached the chassis" should read |
| (Claim 23, lines 6-7) | | --attached to the chassis-- |

Signed and Sealed this
Sixteenth Day of February, 2016

Michelle K. Lee
*Director of the United States Patent and Trademark Office*